US012581258B2

(12) United States Patent
Bouvigne et al.

(10) Patent No.: US 12,581,258 B2
(45) Date of Patent: Mar. 17, 2026

(54) AUTOMATIC-DIAGNOSTIC OF ELECTRICAL EQUIPMENT BY SOUND FOOTPRINT

(71) Applicant: SAGEMCOM BROADBAND SAS, Rueil Malmaison (FR)

(72) Inventors: Gabriel Bouvigne, Rueil Malmaison (FR); Loïg Atzel, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 129 days.

(21) Appl. No.: 18/334,417

(22) Filed: Jun. 14, 2023

(65) Prior Publication Data
US 2023/0412997 A1     Dec. 21, 2023

(30) Foreign Application Priority Data

Jun. 14, 2022     (FR) ...................................... 2205740

(51) Int. Cl.
| | |
|---|---|
| *H04R 29/00* | (2006.01) |
| *G01H 3/06* | (2006.01) |
| *G01H 3/12* | (2006.01) |
| *H04N 21/4425* | (2011.01) |

(52) U.S. Cl.
CPC ............. *H04R 29/003* (2013.01); *G01H 3/06* (2013.01); *G01H 3/125* (2013.01); *H04N 21/4425* (2013.01); *H04R 2430/03* (2013.01)

(58) Field of Classification Search
CPC .... H04R 29/00; H04R 29/001; H04R 29/003; H04N 21/4425; G01H 3/06; G01H 3/125
See application file for complete search history.

(56) References Cited

U.S. PATENT DOCUMENTS

| | | | | |
|---|---|---|---|---|
| 6,845,161 | B2 * | 1/2005 | Boss ....................... | H04R 29/00 |
| | | | | 381/59 |
| 10,495,546 | B2 * | 12/2019 | Bense .................... | G01N 29/46 |
| 10,632,659 | B2 * | 4/2020 | Nishimura ............ | B29C 45/768 |
| 12,253,438 | B2 * | 3/2025 | Houston ................ | G10L 25/51 |
| 2004/0015251 | A1 * | 1/2004 | Hamada ................ | G01M 15/12 |
| | | | | 381/56 |

(Continued)

FOREIGN PATENT DOCUMENTS

| | | |
|---|---|---|
| DE | 102018124210 A1 | 4/2020 |
| EP | 3246674 A1 | 11/2017 |
| FR | 3112017 A1 | 12/2021 |

*Primary Examiner* — Jason R Kurr
(74) *Attorney, Agent, or Firm* — MUNCY, GEISSLER, OLDS & LOWE, P.C.

(57) ABSTRACT

A diagnostic method of electrical equipment which includes a processing unit, an internal microphone, and electrical components other than microphones or speakers, the diagnostic method including the steps of acquiring a received audio signal produced from an ambient sound signal, by the at least one internal microphone or by the at least one external microphone, producing monitoring parameters from the received audio signal, which are representative of an interfering sound signal comprised in the ambient sound signal and emitted by at least one of the electrical components, and detecting a sound anomaly resulting from a failure of at least one electrical component of the electrical equipment from the monitoring parameters.

17 Claims, 6 Drawing Sheets

(56) References Cited

U.S. PATENT DOCUMENTS

| | | | |
|---|---|---|---|
| 2009/0091441 A1* | 4/2009 | Schweitzer, III ... | G01M 13/028 |
| | | | 340/531 |
| 2018/0100895 A1 | 4/2018 | Nadarajan et al. | |
| 2020/0103894 A1 | 4/2020 | Cella et al. | |
| 2020/0234558 A1* | 7/2020 | Butera, III .............. | G01H 3/10 |

\* cited by examiner

AUTOMATIC-DIAGNOSTIC OF ELECTRICAL EQUIPMENT BY SOUND FOOTPRINT

The invention relates to the field of electrical equipment integrating or being able to be connected to at least one microphone.

BACKGROUND OF THE INVENTION

The implementation of an effective and accurate predictive maintenance is particularly interesting for the user of "multimedia"- or "general public"-type electrical equipment, but also for the manufacturer of said electrical equipment—and this, whatever the equipment in question: "conventional" set-top box (or STB), improved set-top box (integrating, for example, one or more speakers), smart speaker, computer, smartphone, games console, etc.

Predictive maintenance consists of monitoring electrical equipment in operation and of comparing the data measured with data previously collected on other equipment of the same type, in order to predict the occurrence of a failure. Predictive maintenance therefore makes it possible to act before the user is deprived of enjoying their equipment.

The predicted awareness of a failure is naturally positive for the image of the manufacturer with users. Predictive maintenance in addition enables the manufacturer to acquire a certain amount of particularly relevant and useful information, as coming from commissioned equipment, and in particular, information about the failure modes of the equipment and about particularities possibly associated with certain batches of equipment.

It is naturally advantageous, for the manufacturer, that predictive maintenance is carried out at a lower cost and without requiring an increased number of components dedicated to this monitoring, and that predictive maintenance makes it possible to monitor as many components as possible of the electrical equipment.

OBJECT OF THE INVENTION

The invention aims to implement a more complete and therefore more effective predictive maintenance on electrical equipment which integrates or which is connected to one or more microphones.

SUMMARY OF THE INVENTION

In view of achieving this aim, a method for diagnosing electrical equipment is proposed, which comprises:
- a processing unit;
- at least one internal microphone, and/or means for connecting to at least one external microphone;
- electrical components other than microphones or speakers;

the diagnostic method being implemented at least partially in the processing unit and comprising the steps of:
- acquiring a received audio signal, produced from a capture of an ambient sound signal, by the at least one internal microphone or by the at least one external microphone;
- producing from the received audio signal, monitoring parameters which are representative of an interfering sound signal comprises in the ambient sound signal and emitted by at least one of the electrical components;

- detecting from monitoring parameters, a sound anomaly resulting from a current or future failure of at least one electrical component of the electrical equipment.

The diagnostic method according to the invention therefore consists of capturing, thanks to the microphone(s), the interfering sound signal emitted by the electrical components, and of detecting, from the interfering sound signal, an immediate or next failure of one or more components of the electrical equipment.

The diagnostic method therefore makes it possible, by a sound footprint analysis, to monitor electrical components of the electrical equipment, which are not components normally provided to emit or capture sound signals.

This monitoring method, which is particularly clever, makes it possible to expand the monitoring to components usually unmonitored or which are difficult to monitor, and this, inexpensively, since no additional hardware component is required for this monitoring. In particular, the diagnostic method does not require that the electrical equipment integrates or is connected to a speaker, and does not require any external diagnostic instrument.

In addition, a diagnostic method such as described above is proposed, wherein the detection step comprises the steps of:
- executing an inference of a previously trained automatic learning model, by using monitoring parameters like input data, the automatic training model being a classification model;
- detecting the sound anomaly according to at least one output value obtained by the execution of said inference.

In addition, a diagnostic method such as described above is proposed, wherein the monitoring parameters form current spectrograms coming from the received audio signal, and wherein the automatic training model has been trained by using a database comprising images representing training spectrograms.

In addition, a diagnostic method such as described above is proposed, wherein the automatic training model is an artificial neural network model of the multilayer perceptron or convolutional neural network type.

In addition, a diagnostic method such as described above is proposed, further comprising the steps:
- of detecting if the electrical equipment, at the time of the acquisition step, is in the process of emitting a useful sound signal;
- if this is the case, of applying the received audio signal at the input of an acoustic echo cancellation module, to produce a resulting signal, the monitoring parameters being obtained from the resulting signal.

In addition, a diagnostic method such as described above is proposed, further comprising the step, if the received audio signal is applied at the input of the acoustic echo cancellation module, of increasing a sampling frequency of the resulting signal, so as to obtain a resampled signal having a sampling frequency equal to that of the received audio signal, the monitoring parameters being obtained from the resampled signal.

In addition, a diagnostic method such as described above is proposed, comprising the step, if the received audio signal has been applied at the input of the acoustic echo cancellation module, of using a first inference model, and otherwise of using a second inference model.

In addition, a diagnostic method such as described above is proposed, further comprising the steps of:
- performing a plurality of acquisitions of the received audio signal;

executing an inference of the training model for each acquisition;

performing a first filtering of the output values to obtain at least one filtered value;

comparing the filtered value with a first predefined threshold and/or a variation of the filtered value over a first predefined duration with a second predefined threshold to detect the sound anomaly.

In addition, a diagnostic method such as described above is proposed, the processing unit comprising an NPU, wherein at least the execution of the inference of the automatic learning model is carried out.

In addition, a diagnostic method such as described above is proposed, wherein the detection step consists of comparing the monitoring parameters with third predefined thresholds and/or of comparing variations of monitoring parameters, over a second predefined duration, with fourth predefined thresholds to detect the sound anomaly.

In addition, a diagnostic method such as described above is proposed, further comprising the steps of:

breaking down the received audio signal into elementary audio signals on frequency sub-bands;

calculating an elementary energy value of each elementary audio signal, the monitoring parameters being obtained from elementary energy values.

In addition, a diagnostic method such as described above is proposed, further comprising the steps of:

performing a plurality of acquisitions of the received audio signal;

for each frequency sub-band, performing a second filtering on the elementary energy values associated with said frequency sub-band to produce a filtered elementary energy value associated with said frequency sub-band, the monitoring parameters being the filtered elementary energy values.

In addition, a diagnostic method such as described above is proposed, further comprising the steps of:

producing a spectral representation of the received audio signal;

detecting peaks in the spectral representation;

the monitoring parameters being obtained from pairs, each comprising a frequency or a frequency sub-band, and an amplitude of a peak at said frequency or in said frequency sub-band.

In addition, a diagnostic method such as described above is proposed, further comprising the steps of:

performing a plurality of acquisitions of the received audio signal;

for each frequency or frequency sub-band, performing a third filtering on the amplitudes of the peaks associated with said frequency or frequency sub-band to produce a filtered peak amplitude associated with said frequency or frequency sub-band, the monitoring parameters being the filtered peak amplitudes.

In addition, a diagnostic method such as described above is proposed, comprising the step of preserving in a long history, for each frequency or frequency sub-band, a mean of a predetermined number of the lowest filtered peak amplitudes.

In addition, electrical equipment is proposed, comprising:

a processing unit comprising an NPU;

at least one internal microphone, and/or means for connecting to at least one external microphone;

electrical components other than microphones or speakers;

the processing unit being arranged to implement the diagnostic method such as described above, and the NPU being arranged to perform at least the execution of the inference of the automatic training model.

In addition, electrical equipment such as described above is proposed, the electrical equipment being a set-top box.

In addition, a computer program comprising instructions which cause the processing unit of the electrical equipment such as described above to carry out the steps of the diagnostic method such as described above.

In addition, a recording medium which can be read by a computer, on which the computer program is recorded, is proposed, such as described above.

The invention will be best understood in the light of the following description of particular non-limiting embodiments of the invention.

BRIEF DESCRIPTION OF THE DRAWINGS

Reference will be made to the accompanying drawings, among which.

DETAILED DESCRIPTION OF THE INVENTION

Figure 1:
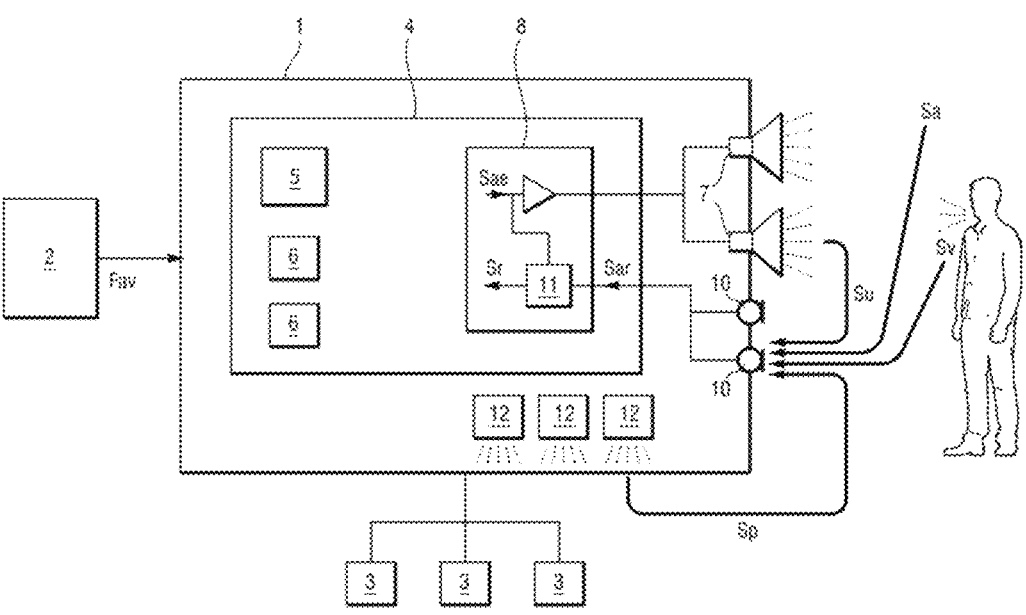
FIG. 1 schematically represents a set-top box, wherein the invention is implemented.

In reference to FIG. 1, a set-top box makes it possible to transmit an audio-video stream Fav, produced by a source 2, to one or more pieces of external equipment 3 which return the audio-video stream Fav.

The source 2 is, for example, a broadcast network. The broadcast network can be a satellite television network, an internet connection, a digital terrestrial television (DTT) network, a cable television network, etc. The source 2 can also be another piece of equipment connected to the set-top box 1, and for example, a CD, DVD or BlueRay player. The source 2 can also be a storage medium such as a USB stick or a memory card connected to the set-top box 1, or also a storage medium internal to the set-top box 1.

The external equipment 3 comprises, in this case, a television and external speakers.

The set-top box 1 first comprises a processing unit 4.

The processing unit 4 comprises one or more processing components, and for example, any general or specialist processor or microprocessor (for example, a DSP (Digital Signal Processor), or a GPU (Graphics Processing Unit), a microcontroller, or a programmable logic circuit, such as an FPGA (Field Programmable Gate Array) or an ASIC (Application Specific Integrated Circuit).

In this case, from among this/these processing component(s), an NPU (Neural Processing Unit) 5 is found, which is a microprocessor particularly adapted to the implementation of artificial intelligence applications.

The processing unit 4 also comprises memories 6. At least one of these memories 6 forms a recording medium which can be read by a computer, on which is recorded at least one computer program comprising instructions which cause the processing unit 4 to execute at least some of the steps of the diagnostic method according to the invention. One of these memories 6 can be integrated in the NPU 5 or in another processing component.

The set-top box 1 comprises one or more internal speakers 7, and a sound transceiver module 8 which is, in this case, integrated in the processing unit 4. The set-top box 1 is thus capable of returning so-called "useful" sound signals Su from emitted audio signals Sae produced by the sound transceiver module 8 and coming, for example, from the audio-video stream Fav. By "useful" sound signals, this means sounds voluntarily emitted, for example, music.

The emission of useful sound signals Su is possibly synchronised with the sound emission performed by the external equipment 3.

The set-top box 1 in addition comprises one or more internal microphones 10, which enable it to implement a voice recognition function. When the user pronounces a voice signal Sv comprising a keyword, this voice signal is captured by the internal microphones 10, which thus produce a received audio signal Sar. The received audio signal Sar is analysed by the sound transceiver module 8 which extracts voice commands from the received audio signal Sar. The set-top box 1 thus performs actions corresponding to voice commands. Alternatively, the received audio signal Sar can be transmitted by the set-top box 1 to remote servers via the internet. The remote servers analyse the received audio signal Sar, extract the voice commands, and transmit the commands contained in the voice signal Sv to the set-top box 1, which thus performs the actions corresponding to the voice commands.

The set-top box 1 also integrated an acoustic echo cancellation module 11 (AEC), which is, in this case, integrated in the sound transceiver module 8. Indeed, when a user pronounces a voice signal Sv comprising a voice command and that, simultaneously, the set-top box 1 returns a useful sound signal Su (music, for example), the internal microphones 10 of the set-top box 1 capture the ambient sound signal Sa which comprises the voice signal Sv emitted by the user and the useful sound signal Su emitted by the internal speakers 7 (and optionally, by the speakers of the external equipment 3). The received audio signal Sar produced by the internal microphones 10 therefore comprises both the voice signal Sv and the useful sound signal Su, which degrades the quality of the voice recognition. The interpretation of the voice command is therefore able to be disrupted by the echo phenomenon.

The acoustic echo cancellation module 11 therefore acquires the emitted audio signal Sae and the received audio signal Sar produced by the internal microphones 10. The acoustic echo cancellation module 11 removes at the received audio signal Sar, the emitted audio signal Sae to provide a "clean" resulting signal Sr, as close as possible to the voice signal Sv (and not containing by the useful sound signal Su). It is this resulting signal Sr which is analysed to detect the keyword and to achieve the voice recognition.

To implement the functions which have just been described, and any of the other functions performed by a "conventional" set-top box, the set-top box 1 comprises a plurality of electrical components 12 other than microphones or speakers. The diagnostic method according to the invention aims to monitor these electrical components 12. The monitoring is based on the analysis of the interfering noise signal Sp produced by these electrical components 12. The diagnostic method according to the invention therefore does not aim to analyse the emission quality of the internal speakers 7, nor the receiving quality of the internal microphones 10.

It is indeed known that components such as coils or condensers can emit an operating noise during the passage of the current.

Any electronic device using coils, inductors, solenoids, self-inductances, transformers (these components are all based on a coil, and can be called different names, according to their task on the circuit), and any other component involving electromagnetism laws described by Maxwell equations, are concerned by this phenomenon.

The interfering sound is often of a low amplitude and can be present during a "normal" operation, but the phenomenon tends to be amplified with the wear of the equipment. When the sound comes from an element based on a coil, it is often called "coil whine", even if this is still not a whine.

The sound of a coil is linked to the principle of mechanical resonance produced in the coil at the frequency of the current which passes through it. From a technical standpoint, a coil is a winding of a conductive wire around a core made of ferromagnetic material (which can also be called a magnetostrictive bar). If the frequency of the signal (current) is resonating with the wire around the core, this causes ultra-rapid micro-vibrations of the coil due to the magnetostriction (which is the phenomenon of deforming a ferromagnetic body subjected to the impact of magnetic fields).

The sound can be constant during certain operating periods, or be intermittent. For example, a suddenly increased current draw can cause an intermittent noise (of the "tick" type). It can thus come about that a "heavy" processing intermittently and briefly performed by a processor, and which is repeated, causes a sequence of spaced apart noises ("tick . . . tick . . . tick").

For example, it can come about that the decoding of frames I (intra) of a video stream, due to the very large size of these frames, causes an intermittent charge draw at the supply stages of the SoC (System On A Chip), due to an intensive use of the arithmetic decoding units of the video stream (when a CABAC-type entropic coding is used). It is sometimes possible that this causes a sound emitted by the coils at each frame decoding I, which will cause an almost fixed, but intermittent frequency sound.

These sounds occur, strictly speaking, during all of the operation of the set-top box 1. They are, however, most of the time, inaudible for a human, either because their frequency is located outside of the audible spectrum (which goes from around 20 Hz to around 20 kHz), or because their amplitude is too low to be heard at a distance of normal use of the set-top box 1.

When the current varies, the electromagnetic field causes a variation of the forces applied on the coil, leading to a succession of deformations of it. In extreme cases, this can lead to the destruction of the coil (coil "breakdown"), but most of the time, this simply leads to a vibration. The effect is all the more pronounced than the signal passing through the coil increases and moves closer to its magnetic resonance frequency.

A development over time of the operating noise, such as a different frequency or a greater amplitude, can indicate a next failure of the set-top box 1. The failure can be linked to the electrical component 12 emitting the noise, but can also be linked to the failure or to the ageing of another electrical component 12, leading to an operating change of the component emitting the noise. Thus, a noise anomaly, present in an interfering noise signal Sp emitted by one or more first electrical components (belonging to the electrical components 12), can result from a current or future failure of one or more second electrical components (also belonging to the electrical components 12) distinct from the first electrical component(s) 12.

In this case, by "failure of a component", this means a non-nominal operation of a component, which potentially leads to a present or future non-nominal operation of the set-top box 1. The component can remain operational, but it has at least one feature which no longer complies with its technical specification or the variation of which will, in the end, make it non-compliant with its technical specification.

The failure can be current or future. The diagnostic method can therefore detect a failure present at the time of the detection, or which will occur in the future.

Figure 2:
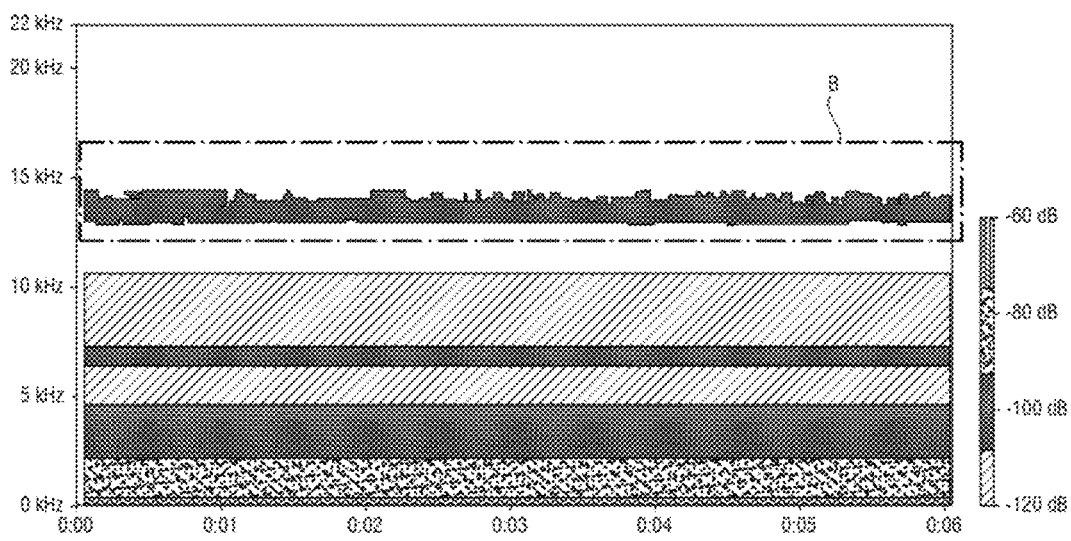
FIG. 2 is a graph representing a spectrogram comprising an abnormal sound.

For example, in FIG. 2, a spectrogram comprising an abnormal sound B produced by a coil is seen. The frequency of this sound is close to 13 kHz.

The diagnostic method consists of capturing the ambient noise signal Sa, and of analysing the interfering noise signal Sp comprised in the ambient noise signal Sa and emitted by one or more electrical components 12, so as to detect a noise anomaly resulting from a failure of one or more electrical components 12 of the set-top box 1. By "interfering noise signal", this therefore means a noise signal emitted accidentally, and therefore the emission of which is not desired. As has just been seen, the noise anomaly can be, for example, an increase of the intensity of the interfering sound signal, but also, for example, a decrease of the amplitude of the interfering noise signal.

First, a diagnostic method according to a first embodiment of the invention is described.

Figure 3:
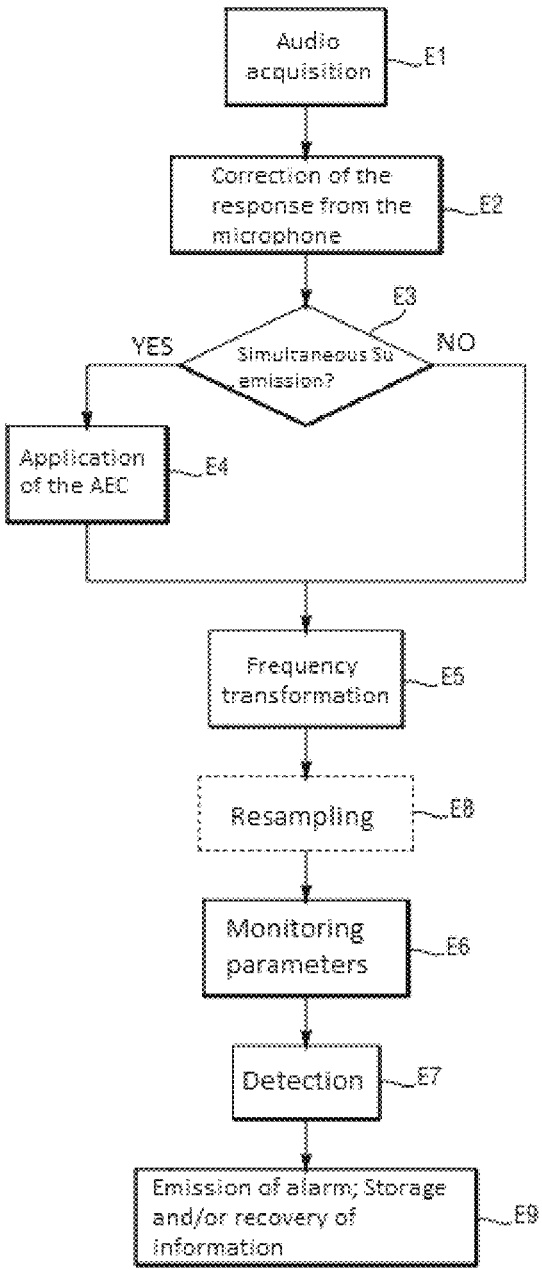
FIG. 3 represents steps of a diagnostic method according to a first embodiment of the invention.

In reference to FIG. 3, the diagnostic method starts with an audio acquisition step (step E1). The internal microphones 10 capture the ambient noise signal Sa, and the noise transceiver module 8 of the processing unit 4 acquires the received audio signal Sar produced by the internal microphones 10.

For each internal microphone 10, it is preferable that the sampling rate is high (44.1 kHz, 48 kHz, even more), in order to enable the detection of high-frequency noises. As is known in the field of signal processing, the sampling frequency must theoretically be double the highest frequency that is sought to be captured. The sound transceiver module 8 comprises low-pass filters to avoid aliasing, which have a transition band of a certain frequency width. It is therefore, practically, only possible to correctly capture noises going up to a frequency located slightly below half the sampling frequency. For example, it is estimated that a sampling frequency of 44.1 kHz makes it possible to capture noises going up to 20 (upper limit of undamaged human hearing) or 21 kHz. A sampling frequency of 48 kHz or more will therefore make it possible to capture noises which cannot be heard by a human, but which can all the same be representative of a component failure.

Naturally, it must be ensured that these noises are also in the sensitivity range of internal microphones 10: if, for example, the internal microphones 20 can only capture signals up to 23 kHz, a sampling frequency of 88.2 kHz would be useless, and a sampling at 48 kHz will thus be limited to.

The internal microphones 10 can be digital output microphones, and can therefore each integrate an analogue/digital converter. The internal microphones 10 can be of the MEMS type.

It is noted that capturing the ambient sound signal Sa can also be done by way of one or more external microphones, which can be individual equipment, or which can be integrated in other appliances, enabling access to the recordings. The set-top box 1 thus comprises means for connecting to external microphones(s), which comprise, for example, a jack or USB socket, or any type of means for communicating with the appliances integrating these external microphones.

The internal microphones 10 are however preferable, due to their immediate proximity with the noises/sounds which are sought to be captured.

It is frequent that the sound emitted by the electrical components 12 of the set-top box 1 changes according to the use which is made of the set-top box 1 (the use impacting on the necessary current).

Advantageously, the processing unit 4 therefore performs several captures and recordings of the ambient noise signal Sa, under different conditions of use, for example when the set-top box 1 is barely urged and when the set-top box 1 is more urged (for example: decoding of several video streams and displaying of these, like when the PiP (Picture In Picture) mode is activated).

The duration of the recordings made must enable the use of detection modules (and therefore must not be too short), while avoiding the analysis being too "heavy" with processing material. A duration of around 1 s is a good compromise, although other durations can be considered.

The frequency of taking measurements is defined as follows. The ageing of the electrical components 12 being a normally very progressive phenomenon (with the notable exception of the imminent failure of a condenser, causing a whine a little time before the breakdown), it is reasonable to take quite spaced apart measurements, for example, once a week.

Figure 4:
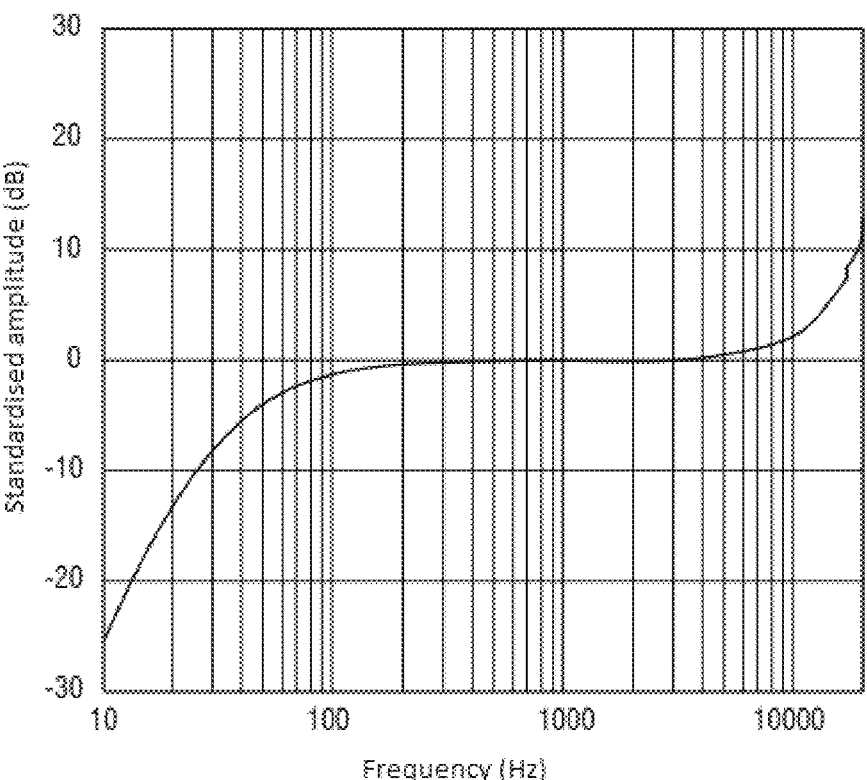
FIG. 4 is a graph comprising a curve of the frequency response of a microphone.

Numerous microphones have a frequency response which is not constant. For example, in FIG. 4, the frequency response of a known microphone is seen. This frequency response increase up to around 200 Hz, then constant, then increasing from around 3 kHz.

Advantageously, the processing unit 4 therefore implements a compensation of the received audio signal Sar by applying, on the received audio signal Sar, an equalisation, in order to restore a "flatter" frequency response, particularly in high frequencies (where the component sounds are the most likely to come): step E2.

The processing unit 4 thus detects if, at the time of capturing the ambient noise signal Sa, the set-top box 1 is in the process or not of returning a useful noise signal Su: step E3.

If the set-top box 1 is in the process of returning a useful noise signal Su, by way of internal speakers 7 or via a noise output (for example, an analogue or digital audio output, or via the HDMI signal intended for the television), it is preferable to remove the useful sound signal Su from the received audio signal Sar to best detect a potential noise anomaly in the received audio signal Sar.

The received audio signal Sar and the emitted audio signal Sae are therefore applied at the input of the acoustic echo cancellation module 11, in order to remove as much as possible, the emitted audio signal from the received audio signal, and thus obtain a resulting audio signal Sr: step E4.

It must be noted that certain acoustic echo cancellation modules are dedicated to the subsequent processing of the voice, and are, due to this, limited at the output to a sampled signal at 8 kHz. It is therefore very probable that the set-top box 1 can capture a broadband signal when the audio reading function is not active, but that it settles for a signal with a more limited band when the audio reading function is active.

The data coming from the recording are initially time representations, of the PCM (Pulse Code Modulation) type.

This type of representation is not very suitable for frequency analysis, and therefore, following step E3 or step E4 (according to which the acoustic echo cancellation module 11 is used or not), the received audio signal (time) should be transformed into a frequency representation: step E5.

The frequency representation is normally provided with two components per frequency: the phase, and the amplitude. In this case, the phase does not provide any useful information for the diagnostic method, and the processing unit 4 only preserves the amplitude information according to the frequency.

The processing unit 4 thus extracts monitoring parameters from the received audio signal Sar, the monitoring parameters being representative of the interfering sound signal Sp comprised in the ambient noise signal Sa and emitted by at least one of the electrical components 12: step E6. Then, the processing unit detects from the monitoring parameters, a noise anomaly resulting from a failure of at least one electrical component 12 of the set-top box 1: step E7.

The monitoring parameters form, in this case, a spectrogram of the received audio signal Sar (or of the resulting signal Sr): for each recording made of the received audio signal, a spectrogram is therefore produced.

The detection of the sound anomaly from the monitoring parameters is a detection by classification based on the image of the spectrogram.

The classification uses an inference model. Yet, it is necessary that the spectrogram, forming the input data of the inference model, always covers the same frequency range, without which the classification based on the image of the spectrogram cannot operate correctly.

However, as has just been seen, it is possible that the acoustic echo cancellation module 11 had been used to process the received audio signal Sar: this is the case, if the set-top box 1 was in the process of returning a useful noise signal Su during the capture of the ambient noise signal Sa (the monitoring parameters are thus obtained from the resulting signal Sr).

Yet, if the acoustic echo cancellation module 11 has been activated, there are two types of resulting signal Sr possible at the output of the acoustic echo cancellation module 11: a signal having the same sampling frequency as the received audio signal Sar, but limited by bandwidth, or a signal having a sampling frequency reduced with respect to the received audio signal Sar.

In the case where the resulting signal Sr is limited by bandwidth, no additional processing is required. However, in the case where the resulting signal Sr has a reduced sampling frequency, an additional step is necessary to obtain a correctly "classifiable" signal: the sampling frequency must be increased, to return it to that of the received audio signal (in order to always have signals of the same sampling frequency). The processing unit 4 proceeds, in this case, with a resampling of the resulting signal Sr, so as to obtain a resampled signal having a sampling frequency equal to that of the received audio signal: step E8. The monitoring parameters are thus obtained from the resampled signal.

This step E8 is carried out before calculating the spectrogram (and therefore, for example, between step E5 and step E6), or after calculating the spectrogram (and therefore, for example, between step E6 and step E7) by thus "completing" the image of the spectrogram (by blank data) in high frequencies.

There is now interest, more specifically, in step E7.

The detection of the noise anomaly consists of executing an inference of a previously trained automatic training model, by using the monitoring parameters as input data. The monitoring parameters are, in this case, so-called "current" spectrograms, each current spectrogram being associated with a recording of the ambient noise signal Sa (and therefore of the received audio signal Sar or of the resulting signal Sr). The noise anomaly is detected according to at least one output value obtained by executing said inference.

The classification is, in this case, a classification of images and not of audio or noise signals.

For example, the TensorFlow Lite library is used, which is a version dedicated to inference, optimised for onboarded environments.

The inference is executed on the NPU 5 via dedicated APIs (Application Programming Interfaces) (such as NNAPI on Android).

By using the TensorFlow Lite library, the transformation into current spectrogram of the received audio signal Sar can, for example, be performed by using the following code:

```
def get_spectrogram(waveform, padding=False,
min_padding=48000):
    waveform = tf.cast(waveform, tf.float32)
    spectrogram = tf.signal.stft(waveform,
    frame_length=2048, frame_step=512, fft_length=2048)
    spectrogram = tf.abs(spectrogram)
    return spectrogram
```

This step thus corresponds to the frequency transformation step E5.

In this code section, tf.signal.stft makes it possible to perform a Short-Term Fourier Transform, and tf.abs removes the phase information, only preserving the amplitude information.

The NPU 5 therefore applies an inference model on the current spectrograms. The inference model has been obtained by previous training of the training model.

The training requires a database. This database comprises recordings obtained from a "healthy" appliance recording corpus, and a "failure" appliance recording corpus. The failure appliances comprise, for example, coil sounds, such as described above, at different frequencies and different amplitudes. The "failure" corpus can be constituted of actually failure appliance recordings and healthy appliance recordings, to which a "failure" signal will have been superposed (technique called increase of the data set). The corpus comprises both static (or quasi-static) and transitory/intermittent failure signals (such as corresponding to the description above).

As has been seen, the data used to produce the current spectrograms can be obtained, either from received audio signals themselves (optionally processed), or from resulting signals Sr obtained by the application of the acoustic echo cancellation module 11 on the received audio signals Sar. Either:

recordings with and without AEC should be had in the corpus, forming the learning database, or two inference models should be used, i.e. a model with use of the acoustic echo cancellation module 11, and a model without use of said module. Thus, if the received audio signal Sar has been applied at the input of the acoustic echo cancellation module 11, the NPU 5 uses a first inference model. Alternatively, the NPU 5 uses a second inference model.

If this second option is opted for, it is thus no longer necessary to extend the spectrum of recordings made at the AEC output (resampling performed in step E8). The quality of the detection will be better with this second option, the two models thus being used systematically on data best corresponding to the features of each of the training sets.

The learned model can be a personalised model. It is also possible to use transfer learning on a pre-trained model.

The automatic training model is, in this case, an artificial neural network model.

The artificial neural network model used is, for example, of the Convolutional Neural Network (CNN) type, for example, MobileNet or InceptionNet.

The model could also, for example, be of the MultiLayer Perceptron (MPL) type.

CNNs are more adapted to the classification of images than MLPs, but the latter are also very effective.

It is noted that it is not possible to directly use a "usual" pre-trained model, as the features (types of sounds) which that invention aims to detect do not form part of the "usual" noises of the usual pre-trained models, and therefore the pre-trained models have no classifier for the failures which could be detected.

The inference model obtained is then converted into a TensorFlow Lite model, in order to be able to be used on the set-top box 1. In order to improve the execution speed of the model and reduce its size, it can be advantageous to reduce its accuracy by re-quantifying its parameters (for example, passage of 32 bit floating values into 16 bit floating values, or into integer values), in order to reduce the necessary accuracy.

The result of executing the inference, on a current spectrogram corresponding to a recording of a particular received audio signal Sar, is therefore the result of a classification of said recording, i.e. a "probability" that the recording belongs to the "healthy" category, and another "probability" of belonging to the "failure" category.

In reality, this is not a probability in the statistical/mathematical sense, but of a "weight" indicating a more or less probable belonging to the categories.

Thus, a pair of output values are obtained for the "healthy" and "failure" variables.

For example, the result of executing the inference is:

Healthy→0.850647

Failure→0.060796

It is observed that the sum of the two output values is not equal to "1", as would be the case if the values expressed a mathematical probability.

The processing unit 4 can, to standardise the output values, such that the sum of the values coming from the classifications is equal to 1, apply a Softmax type function on the output values. The resulting values will thus correspond to a probability.

The way in which the output values are used is now described: step E9.

It is possible to only use the output values of the last recording made to determine if the set-top box 1 must be considered as failure or being at risk of next failure.

Advantageously, however, the processing unit 4 uses a plurality of acquisitions and recordings of the received audio signal, and executes an inference of the training model for each acquisition. Then, the processing unit 4 filters the output values obtained to obtain at least one filtered value.

The processing unit 4 thus compares the filtered value and/or a variation of the filtered value with predefined thresholds to detect the noise anomaly.

The use of a plurality of recordings (for example, 3 or 5) and the filtering make it possible to ensure that the sound does not come from an intermittent external element.

The processing unit 4 can thus, for example, emit an alarm if the output value of the Failure variable, for at least M of the N last recordings, has a value greater than a predetermined threshold S (for example, M=2 and N=3, or M=3 and N=5, and S=0.2).

The processing unit 4 can also preserve output values obtained over a predefined relatively long duration, for example equal to 1 month to 6 months, to make it possible to analyse the development of the output values.

The processing unit 4 analyses the development of the output values over the predefined duration, which makes it possible to detect a progressive degradation of the operation of one or more monitored components, which could optionally be conveyed by a future failure of the set-top box 1.

Figure 5:
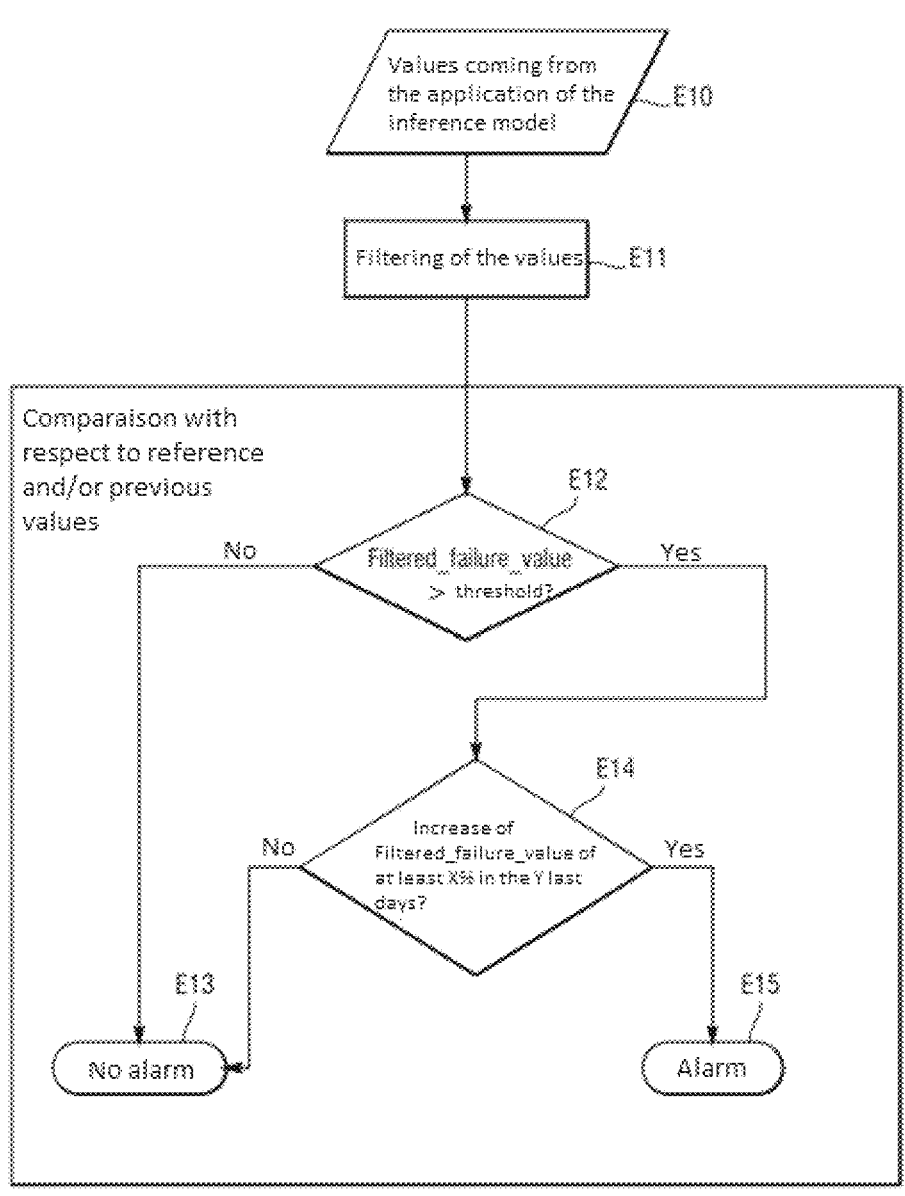
FIG. 5 represents steps of a post-classification data processing.

In reference to FIG. 5, the processing unit 4 implements the following processing, which combines the strategies which have just been described.

The output values are obtained following the execution of the inference of the automatic training model and therefore the application of the inference model (step E10).

These values are thus filtered to obtain a filtered output value "filtered_failure_value": step E11. Numerous filtering strategies are possible, the aim ultimately being to reduce the potential impact of external sounds captured during the recording, which could impact the results of the classification.

The filtering possibly comprises the steps of circulating a mean or a median of output values.

The filtering can consist, for example, of preserving the lowest K values of the "Failure" output value "for example, K=2), then of calculating a mean of these K values, and of assigning said mean to the filtered value "filtered_failure_value". The advantage of this filtering is its simplicity.

Alternatively, the filtering can consist of calculating the median of the lowest K values of the "Failure" output value, and of assigning said median to the variable "filtered_failure_value". This filtering makes it possible to best reduce the impact of interfering captures.

The processing unit 4 thus compares the filtered value with a first predefined threshold: step E12. The first predefined threshold is, for example, equal to 0.2. If the filtered value is less than or equal to the first predefined threshold, the processing unit 4 does not generate an alarm: step E13.

However, in step E12, if the filtered value is strictly greater than the first predefined threshold, the processing unit 4 compares the variation (in this case, the increase) of the filtered value over a first predefined duration with a second predefined threshold: step E14. This second comparison makes it possible to avoid raising an alarm for low values (which will tend more to cause a significant relative variation). If the increase of the filtered value over the first predefined duration is strictly less than the second predefined threshold, the processing unit 4 does not generate an alarm: step E13. However, if the increase of the filtered value over the first predefined duration is greater than or equal to the second predefined threshold, the processing unit 4 generates an alarm: step E15. The second predefined threshold is, for example, equal to 25% and the first predefined duration, to 30 days.

It is noted that the output values resulting from executing the inference are not absolute, but depend on the model itself. Thus, in case of modification or of updating of the model, output values obtained by a new model can no longer be directly compared with those obtained by application of a previous model. The processing unit 4 must not therefore directly compare with such heterogenous data.

Two main means can be used to avoid this pitfall:

in case of updating the model, the processing unit 4 only uses new data to make the comparisons;

in case of updating the model, if the previous recordings have been preserved, the processing unit 4 submits these previous recordings to the new model, in order to obtain new resulting values.

The output values obtained can be preserved locally, or be recovered by the set-top box 1 to a "head-end", i.e. to servers managed by the operator of the network. The recovery of data can be achieved via known means, like for example, via a TR-069-type protocol, or quite simply, via an http request of the set-top box 1 to a server of the operator.

It is thus possible to analyse the results of the diagnostic method obtained for numerous set-top boxes, and, for example, to compare the results obtained for a particular set-top box with the overall ageing of the fleet.

Optionally, the operator (or their technical support) is capable of examining the set-top box 1 such that it sends them recordings having served the detection, for different aims such as, for example:

a detection with more accurate models;

a detection according to the different means;

an analysis by an expert;

the enrichment of the detection model.

It can then be chosen, in case of probably future break-down (or of exceeding an alarm threshold), to communicate this information to the user, or to make it available to technical support.

It is noted that the detection inference model can be updated, for example, by downloading from a server of the operator (via HTTP) or downloading from a carousel (DVB-type data).

Figure 6:
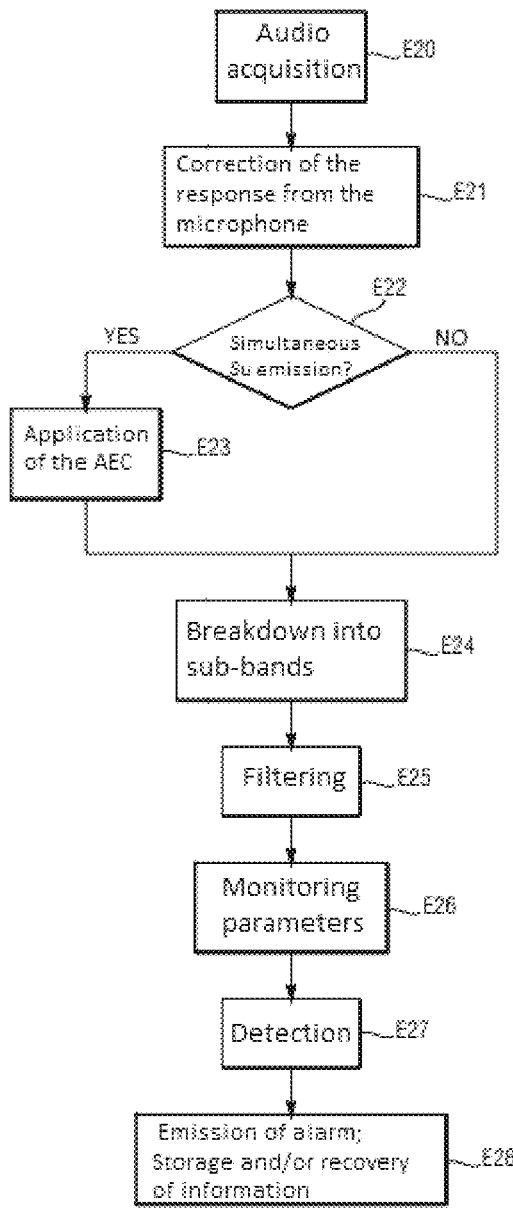
FIG. 6 represents steps of a diagnostic method according to a second embodiment of the invention.

A second embodiment of the diagnostic method according to the invention is now described, in reference to FIG. 6. The detection of the noise anomaly is based on the development of the noise emission of the monitored components, by comparing the current noise spectrum to the noise spectrum of a former measurement (previous measurement), or of a "default" measurement, determined during the manufacture or the design of the set-top box 1, representing that of a set-top box determined as "healthy" (reference measurement).

The diagnostic method starts with an audio acquisition step (step E20). The internal microphones 10 capture the ambient noise signal Sa, and the processing unit 4 acquires the received audio signal Sar produced by the internal microphones 10.

Advantageously, the processing unit 4 performs a plurality of acquisitions and recordings of the received audio signal Sar, in order to ensure that the perceived sound does not come from an intermittent external element.

Advantageously, the processing unit 4 implements a compensation of the received audio signal Sar by applying an equalisation on the received audio signal Sar: step E21.

The processing unit 4 thus detects if, at the time of capturing the ambient noise signal Sa, the set-top box 1 is in the process of or is returning a useful noise signal Su: step E22.

If the set-top box 1 is in the process of emitting a useful noise signal Su, the received audio signal Sar and the emitted audio signal Sae are applied at the input of the acoustic echo cancellation module 11, in order to remove, as much as possible, the emitted audio signal from the received audio signal: step E23.

Following step E22 or step E23 (according to which the acoustic echo cancellation module 11 is activated or not), for each acquisition and recording, the processing unit 4 breaks down the received audio signal Sar into elementary audio signals on frequency sub-bands: step E24. The processing unit 4 thus calculates an elementary energy value of each elementary audio signal.

For this, the processing unit 4 can apply a filter bank on the "original" received audio signal, i.e. on the samples, in the time domain, which constitute the received audio signal.

The processing unit 4 can also transform the received audio signal in the time domain into a signal in the frequency domain, in which case it suffices to group the coefficients according to the defined sub-bands. A greater number of sub-bands enables a finer analysis, but makes the calculations more complex. Sub-bands of a width of 1 kHz or of 2 kHz enable a good compromise.

For each acquisition, the processing unit 4 therefore obtains a list of frequency sub-bands each associated with an elementary energy value.

For each frequency sub-band, the processing unit 4 performs a second filtering on the elementary energy values associated with said frequency sub-band (and coming from the plurality of recordings) to produce a filtered elementary energy value associated with said frequency sub-band: step E25.

The monitoring parameters, obtained from elementary energy values, are the filtered elementary energy values: step E26.

The second filtering can consist, for the processing unit 4, of using a predefined number (5, for example) of recordings spaced apart by a predefined duration (30 minutes, for example). Then, for each frequency sub-band, the processing unit 4 calculates the median value of the elementary energy values, and only preserves this median value. This makes it possible to greatly reduce the impact of an "interfering" capture, which will only have very limited impact on the median (on the contrary of a mean, which would be more impacted by potential non-representative values).

The second filtering can consist, for the processing unit 4, of using a centred mean, which combines a better resistance to sound than the median and a better resistance to extreme values than the mean. For example, if the processing unit 4 performed five recordings, the processing unit 4 removes the minimum and the maximum, and calculates the mean of the three other measurements, or removes the two measurements farthest away from the median and calculates the mean of the three closest measurements.

Then, the processing unit 4 detects a noise anomaly resulting from a failure of at least one electrical component 12 of the set-top box 1 from the monitoring parameters: step E27.

The detection step consists of comparing, for each frequency sub-band, the filtered elementary energy value with a third predefined threshold, and/or consists of comparing, for each frequency sub-band, a variation of the filtered elementary energy values over a second predefined duration with a fourth predefined threshold to detect the sound anomaly.

The processing unit 4 can therefore perform either one of the two comparisons, or both, and detect a noise anomaly if one single threshold is exceeded, or if the two thresholds are exceeded.

Following the detection, the values obtained can be preserved locally, or be recovered by the set-top box 1 at the head-end: step E28.

A third embodiment of the diagnostic method according to the invention is now described.

This time, the processing unit 4 calculates a Fast Fourier Transform (FFT) of the received audio signal Sar or of the resulting signal Sr, and only preserves the amplitude values of the signal in the frequency domain (the phase component of the FFT is not used, in this case).

Figure 7:
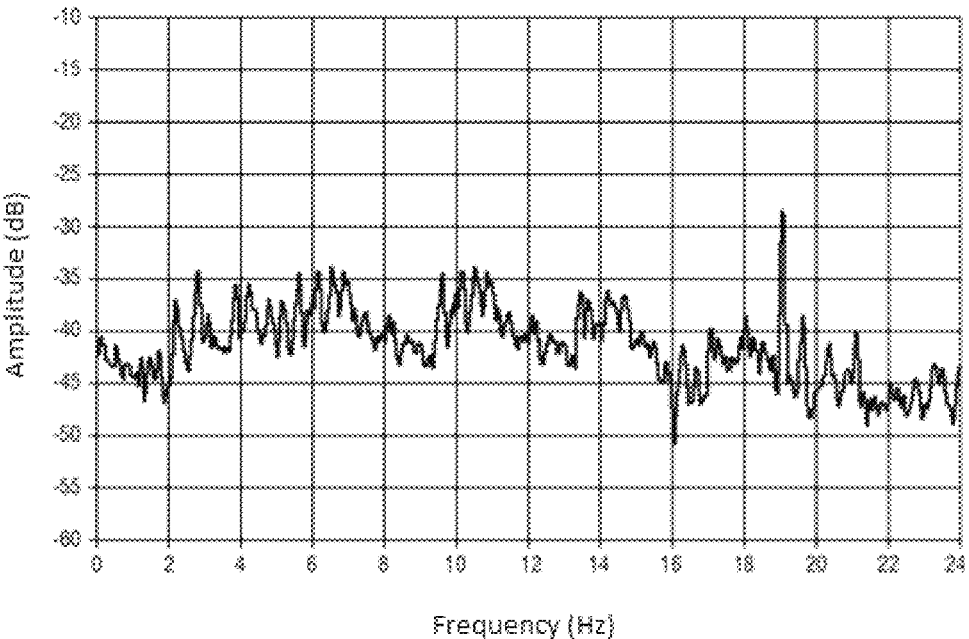
FIG. 7 is a graph comprising a curve of a frequency representation obtained by implementing an FFT on the received audio signal.

The processing unit 4 therefore performs the detection from a simple frequency representation of the received audio signal Sar or of the resulting signal Sr, similar to the frequency representation which can be seen in FIG. 7. In this FIG. 7, a sound at the frequency of 19 kHz is observed.

The processing unit 4 thus detects peaks in the spectral representation. The processing unit 4 thus preserves a list of detected peaks, as well as their value (which can be similar to a very simplified version of spectral envelope calculation).

The monitoring parameters are obtained from pairs each comprising a frequency of a frequency sub-band, and an amplitude of a peak at said frequency or in said frequency sub-band.

For example, the processing unit 4 only preserves a predetermined number N of the highest peaks, for example, the 3 or 5 highest peaks. The processing unit 4 therefore obtains a list of N pairs [frequency; amplitude].

The pairs obtained are, for example, as follows:

[[8.24 kHz; −72 dB]; [12.65 kHz; −43 dB]; [16.64 kHz; −68 dB]].

The detection step consists again of comparing the monitoring parameters with third predefined thresholds and/or of comparing variations of monitoring parameters, over a second predefined duration, with fourth predefined thresholds to detect the sound anomaly.

Thus, for example, for each pair, the processing unit 4 compares the value of the amplitude of the peak with a third predefined threshold and detects a noise anomaly if said value is greater than the third predefined threshold.

Alternatively, for example, for each pair, the processing unit 4 compares the variation, over the second predefined duration, of the value of the amplitude of the peak with a fourth predefined threshold, and detects a noise anomaly if said variation is greater than the fourth predefined threshold.

These different detection methods can be applied on a simple frequency representation (one single value averaged out by frequency for the whole duration of the captured sample), or on a frequency representation showing the time evolution, of the spectrogram type.

Figure 8:
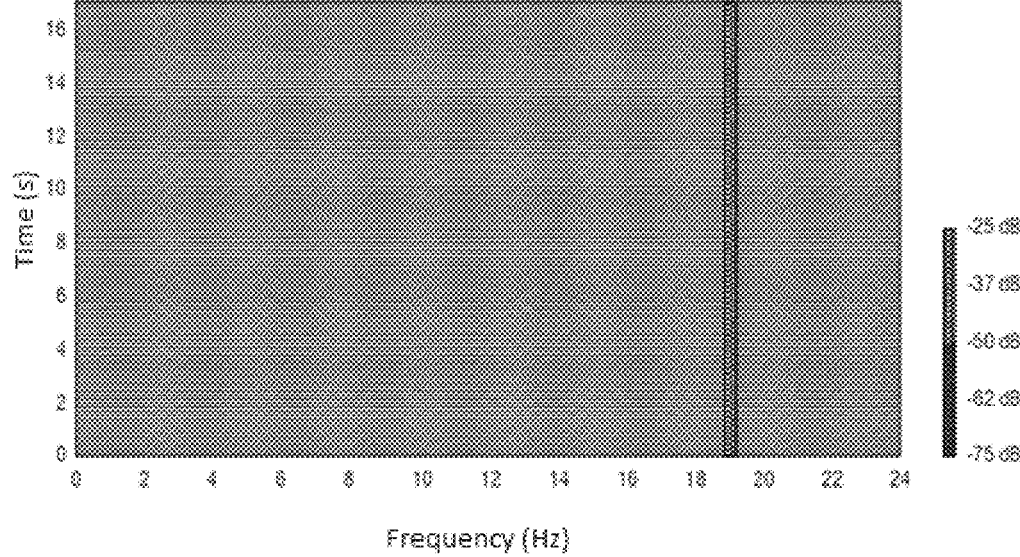
FIG. 8 is a graph comprising a spectrogram obtained for a received audio signal similar to that of FIG. 7.

Such a spectrogram, obtained for a signal similar to that having made it possible to obtain the frequency representation which can be seen in FIG. 7, can be seen in FIG. 8.

To respond to the detection objectives, the duration of the captured sample being relatively short (for example, around one second or less), and as the failures to be detected have relatively constant features over such a time lapse, a simple frequency representation will have the advantage, with respect to a spectrogram, to reduce the calculations necessary for the detection, and to perform a time averaging making it possible to filter the values (reduction of the sound of the signal).

The processing of data coming from the detection can take several forms.

The processing unit 4 can detect a noise anomaly and generate an alarm only based on the last recording made: as soon as an anomaly signal is produced, the processing unit 4 detects a sound anomaly.

Preferably, the processing unit 4 uses several successive recordings, in order to ensure that the noise does not come from an intermittent external element.

For each frequency or frequency sub-band, the processing unit 4 performs a third filtering on the amplitudes of the peaks associated with said frequency or frequency sub-band to produce a filtered peak amplitude associated with said frequency or frequency sub-band, the monitoring parameters being the filtered peak amplitudes.

The processing unit can thus consider a predefined number N of the last recordings to detect a noise anomaly; for example, N=3 or 5.

Thus, if an anomaly signal is produced for each of the N last recordings, or for at least M recordings out of the N last recordings, a noise anomaly is detected. For example, the processing unit 4 generates an alarm if an anomaly signal is produced for at least 2 of the 3 last recordings (i.e. if one of the peaks has an amplitude greater than −50 dB out of 2 of the 3 last recordings).

The processing unit 4 can also detect an anomaly based on the development of the monitoring parameters.

The processing unit 4 can thus store the peaks and the frequencies on a predefined long-duration history, for example, of several weeks (even several months). The processing unit 4 uses this long history of values coming from the detection, to then enable the analysis of their development.

The increases of the monitoring parameters detected over time (development over several weeks) will make it possible to characterise a degrading set-top box, and which could optionally be subjected to a next failure.

For a given date, the processing unit 4 preserves, for example, in the long history, for each frequency or frequency sub-band, a mean of a predetermined number of the lowest filtered peak amplitudes.

Each frequency sub-band is, for example, defined by a low frequency variation, for example +/−500 Hz, around a central frequency (that is a total range of 1000 Hz).

It is assumed, for example, that the processing unit 4 has performed three recordings which give the following measurements:

[[8.24 kHz; −72 dB]; [12.65 kHz; −43 dB]; [16.64 kHz; −68 dB]]

[[7.11 kHz; −78 dB]; [12.38 kHz; −41 dB]; [13.25 kHz; −30 dB]]

[[6.08 kHz; −71 dB]; [12.42 kHz; −43 dB]; [16.01 kHz; −65 dB]]

The first set of values (around 7 kHz) does not have at least 2 values in a range of +/−500 Hz, it is therefore not preserved.

The second set of values (around 12 kHz) has 3 values located in a range of +/−500 Hz. The processing unit 4 will therefore retain the mean of the 2 lowest values ([12.35 kHz; −43 dB] and [12.42 kHz; −43 dB]), and therefore [12.54 kHz; −43 dB]. It is noted that the dBs are logarithmic values, and that it is therefore not possible to directly calculate a linear average of dB values. First, the values must be linearised:

$$X\_lin=10^{\wedge}(X\_dB/10),$$

then the mean of the linear values must be taken, then the mean must be converted into dB:

$$X\_dB=10*\log(X\_lin).$$

The third set of values only has 2 values located in a range of +/−500 Hz. The processing unit 4 will therefore retain the mean of these 2 values ([16.64 kHz; −68 dB] and [16.01 kHz; −65 dB]), which gives [16.33 kHz; −66 dB].

The third value ([13.25 kHz; −30 dB]), transitory, is probably due to an external sound (like, for example, another appliance in the proximity), and is filtered by the selection method.

In this example, the processing unit 4 will therefore retain, in the long history, the values:

[[12.54 kHz; −43 dB]; [16.33 kHz; −66 dB]]

The processing unit 4 generates an alarm if, for example, one of the amplitudes of the peak associated with a frequency sub-band increases by more than X %.

In order to avoid raising an alarm for low values (which will tend more to cause a relative significant variation), a comparison with a threshold can be added.

For example, the processing unit 4 produces an alarm message if, for a given frequency band (for example, +/−500 Hz around a given central frequency), the amplitude of the peak in said frequency band increases by at least 10% over a duration of 30 days.

Other strategies can be applied (instead of or in addition), like for example, to generate an alarm if a value (after application of a filtering method, such as described above) is greater than −40 dB.

Naturally, the invention is not limited to the embodiments described, but includes any variant entering into the field of the invention such as defined by the claims.

The electrical equipment, wherein the invention is implemented, is not necessarily a set-top box, but can be any electrical equipment comprising or which could be connected to one or more microphones: smart speaker, computer, smartphone, games console, etc.

The architecture of the electrical equipment can, naturally, be different from that described in this case.

The NPU can only perform the application of the inference model, but also implement another or other steps of the diagnostic method. The processing unit does not necessarily comprise an NPU. The application of the inference model is therefore not necessarily performed in an NPU, but could be performed in any type of adapted component (DSP, GPU, etc.).

The invention claimed is:

1. A diagnostic method of electrical equipment, wherein the electrical equipment comprises:

a processing unit;

at least one internal microphone, and/or means for connecting to at least one external microphone; and electrical components other than microphones or speakers;

the diagnostic method being implemented at least partially in the processing unit and comprising the steps of:

acquiring a received audio signal produced from capturing an ambient sound signal, by the at least one internal microphone or by the at least one external microphone;

producing monitoring parameters from the received audio signal, which are representative of an interfering sound signal comprised in the ambient sound signal and emitted by at least one of the electrical components;

detecting a sound anomaly resulting from a current or future failure of at least one electrical component of the electrical equipment from the monitoring parameters, detecting if the electrical equipment, at the time of acquiring the received audio signal, is in the process of emitting a useful sound signal, or is not in the process of emitting a useful sound signal, the useful sound signal comprising sounds voluntarily emitted;

if the electrical equipment is in the process of emitting a useful sound signal, then applying the received audio signal to an input of an acoustic echo cancellation module, to produce a resulting signal, the monitoring parameters being obtained from the resulting signal; and if the electrical equipment is not in the process of emitting a useful sound signal, then not applying the received audio signal to the input of the acoustic echo cancellation module.

2. The diagnostic method according to claim 1, wherein the detection of the sound anomaly comprises the steps of:

executing an inference of a previously trained automatic training model, by using the monitoring parameters as input data, the automatic training model being a classification model;

detecting the sound anomaly according to at least one output value obtained by executing said inference.

3. The diagnostic method according to claim 2, wherein the monitoring parameters form current spectrograms coming from the received audio signal, and wherein the automatic training model has been trained by using a database comprising images representing training spectrograms.

4. The diagnostic method according to claim 2, wherein the automatic training model is an artificial neural network of convolutional neural network or multilayer perceptron type.

5. The diagnostic method according to claim 2, further comprising the steps of:

performing a plurality of acquisitions of the received audio signal;

executing an inference of the training model for each acquisition;

performing a first filtering of the output values to obtain at least one filtered value;

comparing the filtered value with a first predefined threshold and/or a variation of the filtered value over a first predefined duration with a second predefined threshold to detect the sound anomaly.

6. The diagnostic method according to claim 2, the processing unit comprising a Neural Processing Unit (NPU), wherein at least one execution of the inference of the automatic training model is performed.

7. Electrical equipment comprising:

a processing unit comprising an Neural Processing Unit (NPU);

at least one internal microphone, and/or means for connecting to at least one external microphone;

electrical components other than microphones or speakers;

the processing unit being arranged to implement the diagnostic method according to claim 2, and the NPU being arranged to perform at least the execution of the inference of the automatic training model.

8. The electrical equipment according to claim 7, the electrical equipment being a set-top box.

9. A non-transitory computer-readable storage medium storing a computer program including instructions that cause the processing unit of the electrical equipment according to claim 7 to carry out the steps of the diagnostic method which comprises:

acquiring a received audio signal produced from capturing an ambient sound signal, by the at least one internal microphone or by the at least one external microphone;

producing monitoring parameters from the received audio signal, which are representative of an interfering sound signal comprised in the ambient sound signal and emitted by at least one of the electrical components;

detecting a sound anomaly resulting from a current or future failure of at least one electrical component of the electrical equipment from the monitoring parameters;

detecting if the electrical equipment, at the time of the acquisition step, is in the process of emitting a useful sound signal, which comprises sounds voluntarily emitted; and if this is the case, then applying the received audio signal at the input of an acoustic echo cancellation module, to produce a resulting signal, the monitoring parameters being obtained from the resulting signal.

10. The diagnostic method according to claim 1, further comprising increasing a sampling frequency of the resulting signal, if the received audio signal is applied at the input of the acoustic echo cancellation module, so as to obtain a resampled signal having a sampling frequency equal to that of the received audio signal, the monitoring parameters being obtained from the resampled signal.

11. The diagnostic method according to claim 1, comprising using a first inference model, if the received audio signal has been applied at the input of the acoustic echo cancellation module, and using a second inference model, if the received audio signal has not been applied at the input of the acoustic echo cancellation module.

12. The diagnostic method according to claim 1, wherein the detection of the sound anomaly consists of comparing the monitoring parameters with third predefined thresholds and/or of comparing variations of the monitoring parameters, over a second predefined duration, with fourth predefined thresholds to detect the sound anomaly.

13. The diagnostic method according to claim 12, further comprising the steps of:
breaking down the received audio signal into elementary audio signals on frequency sub-bands;
calculating an elementary energy value of each elementary audio signal, the monitoring parameters being obtained from the elementary energy values.

14. The diagnostic method according to claim 13, further comprising the steps of:
performing a plurality of acquisitions of the received audio signal;
for each frequency sub-band, performing a second filtering on the elementary energy values associated with said frequency sub-band to produce a filtered elementary energy value associated with said frequency sub-band, the monitoring parameters being the filtered elementary energy values.

15. The diagnostic method according to claim 12, further comprising the steps of:
producing a spectral representation of the received audio signal;
detecting peaks in the spectral representation;
the monitoring parameters being obtained from pairs each comprising a frequency or a frequency sub-band, and an amplitude of a peak at said frequency or in said frequency sub-band.

16. The diagnostic method according to claim 15, further comprising the steps of:
performing a plurality of acquisitions of the received audio signal;
for each frequency or frequency sub-band, performing a third filtering on the amplitudes of the peaks associated with said frequency or frequency sub-band to produce a filtered peak amplitude associated with said frequency or frequency sub-band, the monitoring parameters being the filtered peak amplitudes.

17. The diagnostic method according to claim 16, comprising the step of preserving in a long history, for each frequency or frequency sub-band, a mean of a predetermined number of the lowest filtered peak amplitudes.

\* \* \* \* \*